March 21, 1967 — W. A. LUTZ — 3,310,371
PRODUCTION OF AMMONIUM PHOSPHATE
Filed Oct. 30, 1962
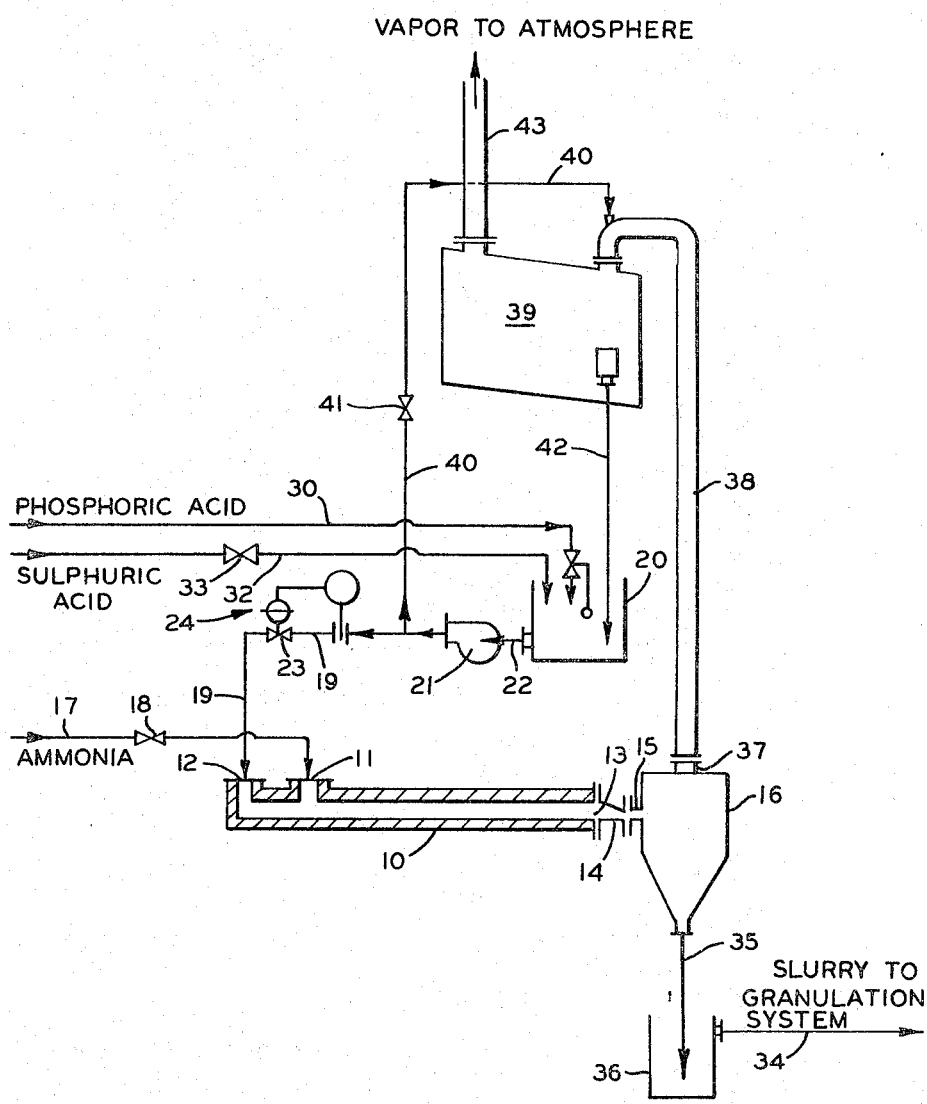
INVENTOR.
WILLIAM A. LUTZ

United States Patent Office 3,310,371
Patented Mar. 21, 1967

3,310,371
PRODUCTION OF AMMONIUM PHOSPHATE
William A. Lutz, Weston, Conn., assignor to Dorr-Oliver Incorporated, Stamford, Conn., a corporation of Delaware
Filed Oct. 30, 1962, Ser. No. 234,160
5 Claims. (Cl. 23—107)

This invention relates to a process for making ammonium phosphate fertilizer, including monoammonium phosphate and diammonium phosphate, and more particularly to an improved process for making a slurry of said ammonium phosphate from wet process phosphoric acid which is amenable to granulation and drying.

The manufacture of ammonium phosphate has hitherto been accomplished by reacting ammonia with phosphoric acid in a series of three tanks in which the reaction mixture flows from one tank to another by gravity. The tanks are made of steel and lined with lead and acid-proof brick, because of the highly corrosive nature of the materials being reacted. Each tank is provided with agitating means to ensure thorough mixing of the material introduced therein and with air cooling means for controlling the heat generated by the reaction.

The principal reaction takes place in the first and second tanks. The third tank, known as the surge tank, merely acts to catch surges in the reaction slurry which occur during operation and is primarily a safety feature.

In the first tank phosphoric acid and ammonia are brought together by bubbling the ammonia through the acid. The reaction is exothermic and is characterized by the generation of large amounts of steam. The reaction slurry is transferred via a launder system to the second tank where it is subjected to further treatment with ammonia with the generation of more steam.

Efficient operation requires that steam generated by the reaction be removed from the reactors as rapidly as possible. This is accomplished by maintaining the area above the reaction slurry under a slight negative pressure. However, as the rate of flow of steam from the reactors is increased the vapor pressure above the reaction slurry is reduced causing violent boiling of the slurry. As a consequence, sudden surges of the reaction slurry occurs. These surges, if not controlled, will eventually adversely affect the equipment later in the process. Further, the danger always exists that the violently boiling slurry may splash out of the tank onto plant personnel. These disadvantages are presently overcome by increasing the tank surface area. Therefore, tanks are designed on the basis of steam release as a result of heat of reaction and consequently as the size of the plant increases so must the size of the aforesaid tanks.

Obviously, the prior art method of producing ammonium phosphate leaves much to be desired.

It is, therefore, an object of the present invention to provide a process for producing ammonium phosphate which has none of the disadvantages of the above-mentioned prior art method and which requires only a simple device for its operation.

It is another object of the present invention to produce ammonium phosphate in a manner which is less costly and more efficient than has heretofore been accomplished.

It is another object of the present invention to provide a process wherein the reactants are more thoroughly mixed to produce a slurry which is amenable to granulation and drying.

These and other objects and advantages will become apparent from the following description.

According to the present invention there is provided a process for making a slurry of ammonium phosphate which comprises mixing aqueous wet process phosphoric acid with ammonia in a substantially hollow cylindrical reactor of sufficient length to complete the reaction of ammonia with phosphoric acid to form ammonium phosphate. The steam produced by this exothermic reaction generates a positive pressure within the reactor which forces the reaction slurry through the reactor and into a cyclonic type separator wherein the ammonium phosphate slurry is separated from the steam and any unreacted material.

In order that this invention may be readily carried into effect, this invention will now be described with reference to the accompanying diagrammatic drawing which illustrates the preferred embodiment for carrying out the process of this invention.

In the drawing, reference numeral 10 designates a hollow stainless steel cylindrical reactor preferably maintained in a substantially horizontal position. The reactor 10 is provided at one end thereof with inlets 11 and 12 through which the materials to be reacted are fed and at the other end with outlet 13 for discharging the reaction slurry. Outlet 13 communicates through suitable connecting means 14 with the inlet 15 of a cyclonic type separator 16 or equivalent device.

Ammonia, such as anhydrous liquid ammonia, from any suitable source, not shown, is introduced into the reactor inlet 11 via line 17 provided with a suitable control means 18.

Wet process phosphoric acid is introduced into reactor inlet 12 from a supply tank 20 via line 19 provided with a valve 23. Line 19 is preferably provided with a centrifugal pump 21 for withdrawing acid from tank 20 via line 22. The flow in line 19 may be controlled by any well known pneumatic flow metering device indicated generally by numeral 24.

Supply tank 20 insures a constant supply of phosphoric acid to be reacted in reactor 10. Said acid may be fed into said tank via line 30 which preferably is provided with a float valve 31 to maintain a constant level of acid in the tank 20.

In operation, the ammonia and phosphoric acid are preferably sprayed into the reactor 10 to produce a fog or mist of the reactants. The reactants, in the form of a fine mist, are now capable of substantially complete reaction since the molecules of ammonia and phosphoric acid can be thoroughly mixed.

As indicated above, the reaction of ammonia and phosphoric acid is exothermic and is characterized by the generation of large amounts of steam. This steam, which is in violent turbulent motion due to the pressure which it creates in the reactor, will cause thorough mixing of the starting material to form ammonium phosphate. Furthermore, because of this turbulence, the tendency of large groups of ammonium phosphate molecules to combine with each other is overcome. Therefore, only droplets of ammonium phosphate are formed, which droplets lend themselves more readily to granulation and drying.

Eventually, the steam will convey the ammonium phosphate droplets through the reactor 10 into a cyclonic separator 16.

In the cyclonic separator 16 the ammonium phosphate slurry resulting from the reaction of ammonia with phosphoric acid is separated from the steam and any unreacted ammonia by centrifugal force and is discharged via line 35 into a sealed pot 36 from where the slurry is forwarded to a conventional granulation and drying system via line 34.

The steam and any unreacted ammonia reports to the overflow discharge 37 of the cyclonic separator 16 and is carried via line 38 to a scrubber indicated generally by reference numeral 39.

In the scrubber any unreacted ammonia together with any entrained ammonium phosphate are recovered by means of phosphoric acid circulated from the supply tank 20 and introduced therein via line 40 provided with a suitable valve means 41.

The recovered materials are removed from the scrubber 39 via line 42 and delivered into the supply tank 20 where eventually they are delivered to the reactor tank 10 for further treatment.

The scrubbed steam free from chemical impurities is discharged to atmosphere via line 43.

Alternately, the scrubbed steam may be used to vaporize the liquid ammonia to be fed to the reactor.

In certain instances, it may be desirable to change N and $P_2O_5$ ratio of the fertilizer. This can be accomplished by introducing sulphuric acid into the reactor 10 to form a mixture of ammonium sulphate and ammonium phosphate. Preferably, the sulphuric acid is introduced into the reactor 10 along with the phosphoric acid by feeding said sulphuric acid into tank 20 via line 32 provided with valve 33.

It will be obvious to those skilled in the art that further modifications to the teachings of this invention may be made without departing from the spirit thereof. For instance, gaseous ammonia or ammonium hydroxide may be substituted for the anhydrous liquid ammonia.

Further, phosphoric acid may be initially introduced into the scrubber 39 rather than into tank 20.

Obviously, other means of introducing the reactants into the reactor 10 are feasible.

The principal advantages of my invention over the aforesaid prior method may be summarized as follows:

(a) Agitating means are no longer necessary, therefore the power consumption of said agitator has been completely eliminated.

(b) Capital investment is reduced since the three large steel tanks are replaced by relatively inexpensive cylindrical reactor.

(c) The grade of fertilizer may now be changed in a matter of minutes whereas heretofore each tank had to be drained requiring about 8 hours.

(d) Granulation and drying of the slurry is improved since droplets of ammonium phosphate are obtained which are easier to handle.

(e) The prior art method required that cooling air be blown into the reaction mixture to control the temperature and to prevent boiling over. The process of the present invention is not faced with this problem.

(f) The prior art method involved some hazard since it was always possible for the material to boil over and splash onto the personnel. This hazard has been eliminated in the present invention.

(g) The process of the present invention does not require constant attention since the surges which occurred in the prior art method have been eliminated.

(h) In the present invention ammonium hydroxide can be used without any difficulties. The prior art method could not satisfactorily use ammonium hydroxide because of the high temperature surrounding the bubble pipe.

From the foregoing description of the preferred embodiment of this invention it is evident that the objects of this invention, together with many practical advantages, are successfully achieved. While the preferred embodiment of my invention has been described, numerous further modifications may be made without departing from the scope of the invention as defined by the appended claims.

Therefore, it is to be understood that all matters herein set forth as shown in the accompanying drawing are to be interpreted in an illustrative and not in a limiting sense.

I claim:

1. A process for producing ammonium phosphate by reacting wet process phosphoric acid with ammonia which comprises, establishing and maintaining a confined reaction zone having means for introducing the materials to be reacted at one end thereof and means for discharging the reacted material at the other end thereof, introducing into said reaction zone aqueous wet process phosphoric acid at least a portion of which has been subjected to partial neutralization with the unreacted ammonia separated from the reaction mixture obtained during the previous reaction of phosphoric acid and ammonia, simultaneously introducing into said reaction zone ammonia, thus forming ammonium phosphate and by-product steam, allowing said steam to create a positive pressure within said reaction zone, utilizing said steam to convey the thus formed ammonium phosphate toward said discharge means, continuously discharging said ammonium phosphate into a separation zone, and wherein the thus formed ammonium phosphate is separated from said steam and unreacted ammonia, and recovering said unreacted ammonia by contacting feed acid with said ammonia prior to introduction into the reaction zone.

2. Process according to claim 1 wherein the ammonia is in the form of anhydrous liquid ammonia.

3. Process according to claim 1 wherein the ammonia is in the form of ammonia gas.

4. Process according to claim 1 wherein the ammonia is in the form of ammonium hydroxide.

5. Process according to claim 1 wherein the feed acid is a mixture of wet process phosphoric acid and sulfuric acid.

References Cited by the Examiner

UNITED STATES PATENTS

| | | | |
|---|---|---|---|
| 1,001,350 | 8/1911 | Caro et al. | 71—36 |
| 1,142,068 | 6/1915 | Washburn | 23—107 |
| 1,264,513 | 4/1918 | Hechenbleikner | 23—107 |
| 1,264,514 | 4/1918 | Hechenbleikner | 23—107 |
| 1,367,846 | 2/1921 | Washburn | 71—36 |
| 1,822,040 | 9/1931 | Klugh et al. | 23—107 |
| 1,869,688 | 8/1932 | Heimann | 71—36 X |
| 1,962,185 | 6/1934 | Fauser | 23—50 |
| 1,989,175 | 1/1935 | Siems | 23—50 |
| 2,792,286 | 5/1947 | Wordie et al. | 23—107 |
| 3,125,420 | 3/1964 | Coon et al. | 23—259.1 |

OTHER REFERENCES

Waggaman, "Phosphoric Acid, Phosphates and Phosphatic Fertilizers," 2nd Edition, Reinhold, New York, 1952, pages 314–317.

OSCAR R. VERTIZ, *Primary Examiner.*

O. F. CRUTCHFIELD, *Assistant Examiner.*